(12) United States Patent
Bian (10) Patent No.: US 7,486,337 B2
(45) Date of Patent: Feb. 3, 2009

(54) CONTROLLING THE OVERLAY OF MULTIPLE VIDEO SIGNALS

(75) Inventor: Qixiong J. Bian, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 624 days.

(21) Appl. No.: 10/744,224

(22) Filed: Dec. 22, 2003

(65) Prior Publication Data

US 2005/0134739 A1    Jun. 23, 2005

(51) Int. Cl.
*H04N 9/74* (2006.01)
*H04N 5/445* (2006.01)
*H04N 9/76* (2006.01)

(52) U.S. Cl. .................. 348/589; 348/565; 348/600; 345/589; 345/592; 345/629

(58) Field of Classification Search ......... 348/564–565, 348/589, 600; 345/589, 592, 629
See application file for complete search history.

(56) References Cited

U.S. PATENT DOCUMENTS

| | | | | |
|---|---|---|---|---|
| 5,123,085 | A * | 6/1992 | Wells et al. ................ 345/421 |
| 5,467,144 | A * | 11/1995 | Saeger et al. .............. 348/566 |
| 5,923,385 | A * | 7/1999 | Mills et al. ................. 348/715 |
| 5,926,647 | A * | 7/1999 | Adams et al. .............. 712/36 |
| 5,953,691 | A * | 9/1999 | Mills ........................ 702/198 |
| 6,052,648 | A * | 4/2000 | Burfeind et al. ............ 702/3 |
| 6,147,695 | A * | 11/2000 | Bowen et al. .............. 345/503 |
| 6,327,000 | B1 * | 12/2001 | Auld et al. ................. 348/441 |
| 6,486,888 | B1 * | 11/2002 | Fushiki et al. ............. 345/592 |
| 6,603,482 | B1 * | 8/2003 | Tidwell ..................... 345/592 |
| 6,636,222 | B1 * | 10/2003 | Valmiki et al. ............. 345/505 |
| 6,646,686 | B1 * | 11/2003 | Gryskiewicz et al. ....... 348/584 |
| 6,748,107 | B1 * | 6/2004 | Fushiki et al. ............. 382/162 |
| 6,771,274 | B2 * | 8/2004 | Dawson ..................... 345/592 |
| 6,847,375 | B2 * | 1/2005 | Wada ........................ 345/589 |
| 6,903,753 | B1 * | 6/2005 | Gray et al. ................. 345/634 |
| 6,919,897 | B1 * | 7/2005 | Ford et al. ................. 345/506 |
| 6,958,780 | B1 * | 10/2005 | Kawai ....................... 348/458 |
| 6,987,518 | B2 * | 1/2006 | Dawson ..................... 345/592 |
| 7,119,849 | B2 * | 10/2006 | Yui et al. .................... 348/564 |
| 2002/0069411 | A1 * | 6/2002 | Rainville et al. ........... 725/37 |
| 2002/0075407 | A1 * | 6/2002 | Cohen-Solal .............. 348/565 |
| 2003/0020712 | A1 * | 1/2003 | Wada ........................ 345/420 |
| 2003/0107583 | A1 * | 6/2003 | Fushiki et al. ............. 345/611 |
| 2003/0184553 | A1 | 10/2003 | Dawson |
| 2003/0189571 | A1 * | 10/2003 | MacInnis et al. .......... 345/505 |

(Continued)

FOREIGN PATENT DOCUMENTS

WO    WO 94/06111    3/1994

OTHER PUBLICATIONS

PCT Search Report, PCT/US2004/041802, Dec. 5, 2005.

*Primary Examiner*—Brian P Yenke
(74) *Attorney, Agent, or Firm*—Blakely, Sokoloff, Taylor & Zafman LLP (57) ABSTRACT

In one embodiment the present invention includes receiving an alpha component of a graphics signal, receiving a primary video signal, and receiving a secondary video signal. A portion of the alpha component is extracted and applied to the extracted portion to render the secondary video signal over the primary video signal.

24 Claims, 4 Drawing Sheets

U.S. PATENT DOCUMENTS

| | | | |
|---|---|---|---|
| 2004/0109005 A1* | 6/2004 | Witt et al. | 345/611 |
| 2004/0233215 A1* | 11/2004 | Dawson | 345/592 |
| 2005/0122335 A1* | 6/2005 | MacInnis et al. | 345/520 |
| 2005/0134739 A1* | 6/2005 | Bian | 348/600 |
| 2005/0231526 A1* | 10/2005 | MacInnis et al. | 345/592 |
| 2006/0092162 A1* | 5/2006 | Deering et al. | 345/506 |
| 2006/0103671 A1* | 5/2006 | Brown | 345/629 |

* cited by examiner

CONTROLLING THE OVERLAY OF MULTIPLE VIDEO SIGNALS

BACKGROUND

The present invention relates to the field of television and video display and, in particular, to controlling how one video signal is superimposed over another video signal.

Many current televisions, personal video recorders (PVR), video tape recorders (VTR), media centers, and similar devices support video from many different sources. These sources may include tuners, recorders, players and cameras.

The number and types of video sources in any particular device may vary greatly. Signals from terrestrial radio broadcast, cable broadcast, satellite, optic fiber and wide area networks can all offer different programming. Players can provide video from tape, disk or memory and cameras vary greatly in capabilities. All of these sources are currently available to provide video in different formats. These include analog and digital signals with different aspect ratios, different modulation and encoding systems, different resolutions and different supporting audio formats, quality levels and numbers of channels.

In order to view or monitor all of the many different available sources of video programming, many televisions, personal video recorders (PVR), video tape recorders (VTR), media centers, and similar equipment can display one or more video programs on the same screen at the same time. Typically this is called a picture in picture (PIP) display. A PIP display is normally provided by providing a secondary video source in a smaller window superimposed over or overlaid on the primary video source. The primary video source fills the entire display area or at least the entire width or height of the display area. A typical PIP display shows the small window in the same location and same shape at all times and the user can select only which video sources or channels are to be displayed in the primary and secondary positions. In some more complex televisions more than two video sources can be displayed at the same time.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

In one embodiment, a graphics chip generates graphics that are sent over a DVO (Digital Video Out) port in a 32-bit RBGA (Red, Green, Blue, Alpha) pixel format. This RGBA signal is received at the graphics input of a video mixer and alpha blender that also has at least two video inputs. The two video streams are combined for PIP display so that one video stream is scaled down and overlaid on top of the other video stream, which is in full screen mode. One bit of the 8-bit alpha component of the RGBA stream is used to define the overlay region for the smaller video window.

In this embodiment, after the PIP combination, the remaining 7 bits of the 8-bit alpha component are used to define how the resulting video image is further combined and alpha-blended with the graphics image of the RGBA signal. This places the graphics images on top of the video image in either an opaque or translucent manner as determined by the remaining 7-bit alpha component for each pixel in the RGBA graphics stream.

The one bit from the RGBA stream allows the overlay video to be in any desired shape including circles, ellipses, stenciled images etc. and any desired position on the full screen. The instructions for the shape and location are transmitted from the graphics chip to the video mixer using an existing high data rate communications line without requiring any additional hardware.

Figure 1:
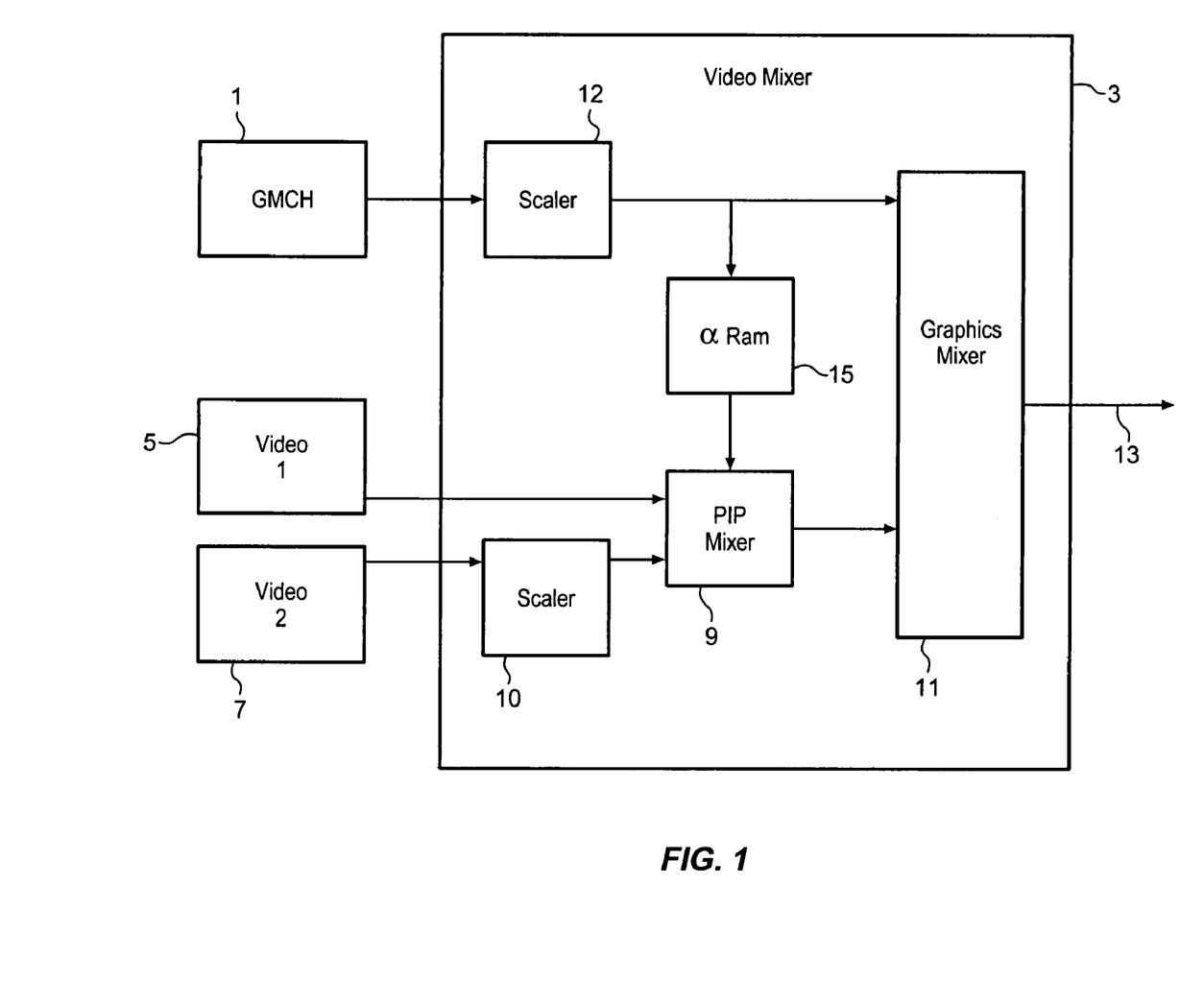
FIG. 1 is a diagram of a video mixing system with a graphics processor input and video inputs according to an embodiment of the present invention.

Referring to FIG. 1, a graphics processor 1 has a DVO port coupled to a DVO port of a video mixer 3. The video mixer also has two or more ports coupled to video sources 5, 7. The graphics processor may be any one of a variety of different graphics processors, including Intel® GMCH (Graphics and Memory Controller Hub) chips. One suitable processor is the Intel® 82835M GMCH processor. The 82835M processor produces a RGBA graphics output signal. This signal has 8 bits for each of a red, green, blue and alpha component for each pixel of a display upon which the graphics signal and the video signal are to be displayed or rendered.

The red, green, and blue components define a brightness level for those three colors for each pixel of the display. The alpha component defines how the pixel is to be blended with any other signals by the video mixer. Using the RGBA signal, a wide range of different kinds of graphic displays, including menus and title banners may be blended with video signals in many different ways.

A DVO port is a three wire interface from the graphics controller to an external device, such as the video mixer 3 or a display device. It uses 1.8V signaling and operates at high frequency and is capable of transferring 32-bit graphics data in 1280×1024 resolutions. A DVO port is one example of how the RGBA signal may be transmitted to the video mixer, however other types of ports and other types of signals may be used. Any type of video or analog communications line may be used including DVI (Digital Video Interface). The use of an RGBA signal and a DVO port is not essential to the invention.

The video signals may come from two different tuners of any variety or from any other source of video signals. The tuners may be for any one of a variety of different analog and digital television signals, whether broadcast, multicast or point-to-point. Examples include NTSC signals, ATSC (Advanced Television Systems Committee) signals, PAL (Phase Alternating Line) signals, cable television signals under the variety of possible standards, DBS (Direct Broadcast Satellite) signals, or any other type of video signal. The tuner may be a composite video tuner. Such a tuner may allow the system to receive video and audio signals from a video recorder, camera, external tuner, or any other device. A great variety of different connectors may be used to receive the video signals from coaxial cables to RCA component video, S-Video, DIN connectors, DVI (digital video interface), HDMI (High Definition Multimedia Interface), VGA (Video Graphics Adapter), IEEE 1394 (Institute of Electrical and Electronics Engineers) and more. In many current video sources, the video input signals are in YCbCr 4:2:2 digital video format and sent to the video mixer through an ITU-R BT.656 (International Telecommunication Union-Radiocommunication Broadcasting Service (television) recommendation) digital video interface. However, different types of formats may be used instead of or in addition to the ITU-R BT.656.

As shown in FIG. 1, the video signals are applied to a video PIP (picture-in-picture) mixer 9 within the video mixer 3. The video PIP mixer combines the two video signals to create a PIP display. The PIP display may be made of any plural number of video signals depending on the number of video signals available and the capabilities of the video mixer. To form the PIP display, one video image may be downscaled to fit within the other video image. This downscaling may be performed by a scaler 10 within the video mixer, between the secondary video input and the PIP mixer or by some other component not shown. The PIP display is provided to a graphics and video mixer 11 within the video mixer 3.

The PIP mixer and the secondary video scaler 10 may be controlled by a user or the parameters may be set by default. The user may select the relative size of the smaller secondary video and its position on the primary video. The user may disable PIP mixing, select only the downscaled or the full screen display, or select which and how many video signals are to be combined. The user may also select sizes, shapes, and positions for the secondary downscaled video.

A graphics signal from the graphics processor is also supplied on the DVO port to a graphics mixer 11 within the video mixer 3 which combines the graphics signal with the PIP display to generate a video output signal 13 to be shown on a display. The graphics image may have the same frame refresh rate as the video signal with which it is mixed or a different refresh rate, for example a higher refresh rate. In one embodiment, the video mixer includes a scaler and scan rate converter 12. This allows the the graphics processor 1 to produce graphics with the same scale and refresh rate regardless of the display format. The video mixer may then scan convert and scale the graphics signal to match the output video signal in format and dimension before the two signals are blended in the graphics mixer.

The graphics mixer will take the individual pixels as defined in the RGBA signal received on the DVO port and blend them with the pixels of the combined PIP display images. The RGB components of the RGB signal are used to define the appearance of each pixel of the graphics image. The A (alpha) component is used to define how the two images are blended. Just as the pixels may be redefined with each graphics image frame, so may be the blending.

In the present embodiment, the RGBA signal has 8 bits available for blending information. However, only 7 bits are used. The eighth bit, the most significant bit, is extracted from the RGBA signal and fed to an alpha map, which can be implemented as internal RAM (Random Access Memory) 15. The RAM may take any of a variety of different configurations. In one embodiment, the RAM may have two memory regions to hold at least two sequential frames of alpha bits. The alpha bits are stored together for each RGBA image, there being one bit for each pixel of each image. The bits are stored in association with a pixel location and used as a mask to apply to a video frame of the display. However, instead of applying this mask to the images of the RGBA signal, the mask is applied to the primary video signal of the PIP display.

In one embodiment, the bit for each pixel specifies only whether the primary video input 5 or the secondary video input 7 is to be displayed in the combined PIP display image. The pixels correspond to the pixels of the secondary image, the smaller image which is overlaid on the primary image of the display. Accordingly, those pixels that are to be used for the secondary image define the shape of the secondary image. The size and location of the secondary image are defined using other configurable parameters. Using a single bit for each pixel of the secondary image any desired shape can be defined.

The PIP video mixer may trim the secondary video to fit the defined shape. For example, if the secondary video has rectangular image frames and the bits of the alpha RAM define a circular frame, then the corners of the secondary video image frames may be cut off (i.e. substituted with primary video pixels) to fit the circular shape. Cutting off the corners may involve showing the primary video instead of the secondary video in the pixels corresponding to the corners of the primary video. Alternatively, the secondary video may be modified in shape or aspect ratio to fit the defined shape.

The components of FIG. 1 may form part of a set-top box, a recorder, a digital media adapter, or be integrated into a tuner system. Such a tuner system may be incorporated into a display, such as a television or a stand-alone unit. The tuner system may be a television or video display, a video or audio recorder, a peripheral device for a computer, a discrete tuner for connection to an entertainment system or any of a variety of other devices including, for example, all or part of the media center of FIG. 3. The device may be a set-top box or it may, for example, be integrated into a television, recorder, digital media adapter, or computer.

Figure 2:
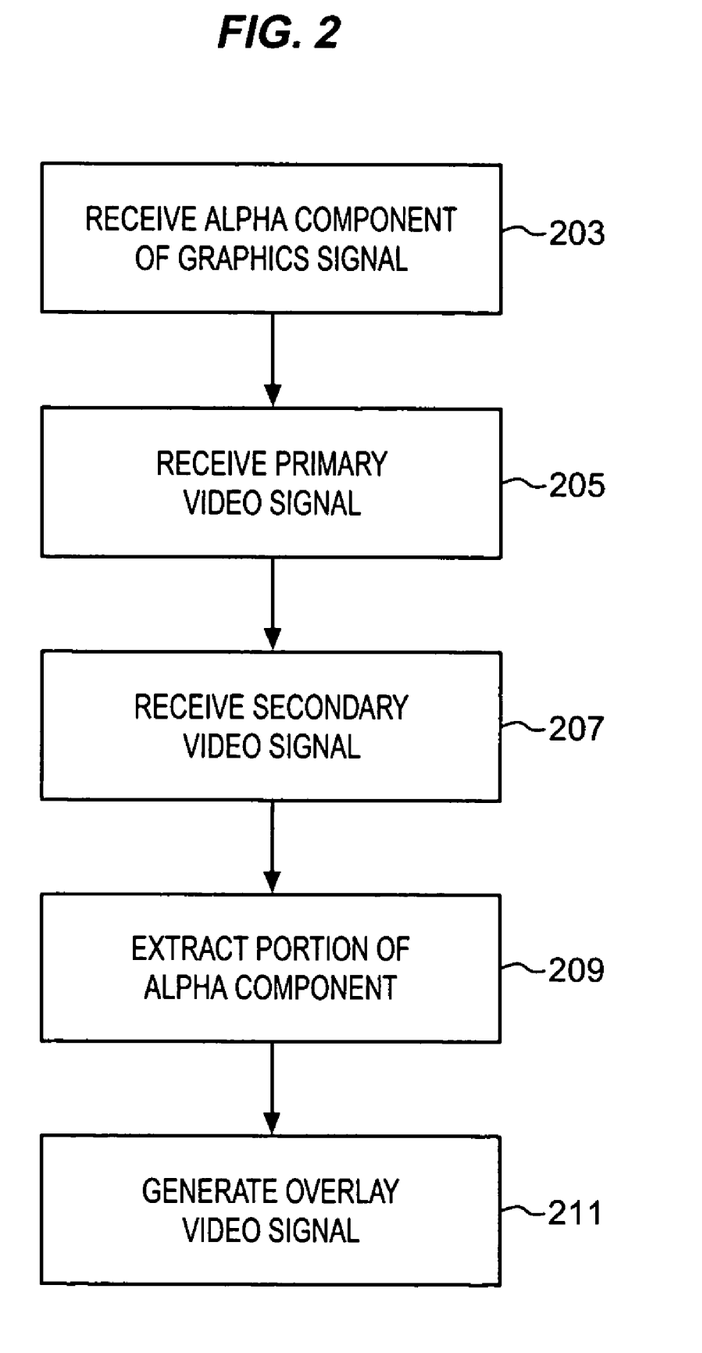
FIG. 2 is a process flow diagram of applying a RGBA signal to picture in picture parameters according to an embodiment of the present invention.

Referring to FIG. 2, a basic process flow from the perspective of the video mixer 3 is shown. The video mixer receives an alpha component of a graphics signal at block 203. It also receives a primary video signal at block 205, and a secondary video signal at block 207. In one embodiment, this alpha component is part of a multiple pixel image signal that has an alpha component for each pixel, such as an RGBA signal. It may be generated by a graphics processor 1 or a GMCH chip. The multiple pixel image signal may have a set of bits, for example 32, for each pixel and the alpha component may be a subset, for example 8, of the set of bits. This subset of bits may include at least one bit to define an overlay for the secondary video signal over the primary video signal.

The video mixer extracts a portion of the alpha component at block 209. In the example of an RGBA signal in which one bit is used to define the overlay, the video mixer extracts that one bit. With, for example, a video mixer that drives a standard definition NTSC Display, the alpha map may have a size of 640×480 bits. Each bit of the alpha component defines whether video 1 or video 2 is selected for each pixel position. Thus the shape and position of the secondary image when it is overlaid on the primary image can be defined by the bit pattern in this alpha map. As the graphics stream gets scan-converted and scaled to match the frame rate and resolution of the video stream, the MSB (Most Significant Bit) of each pixel is tested and the corresponding bit in the alpha map will be set. This one bit, extracted from each pixel may be used to build an alpha map that defines the shape and position of the secondary image when it is overlaid on the primary image.

The PIP mixer's overlay selector determines whether video 1 or video 2 is shown at each pixel position depending the corresponding bit in the alpha map. In this way, the PIP mixer generates the overlay signal at block 211. This overlay signal may be provided to a graphics mixer to add graphics to the signal or any of a variety of other devices. It may also be output without further processing as, for example, a picture-in-picture display.

Figure 3:
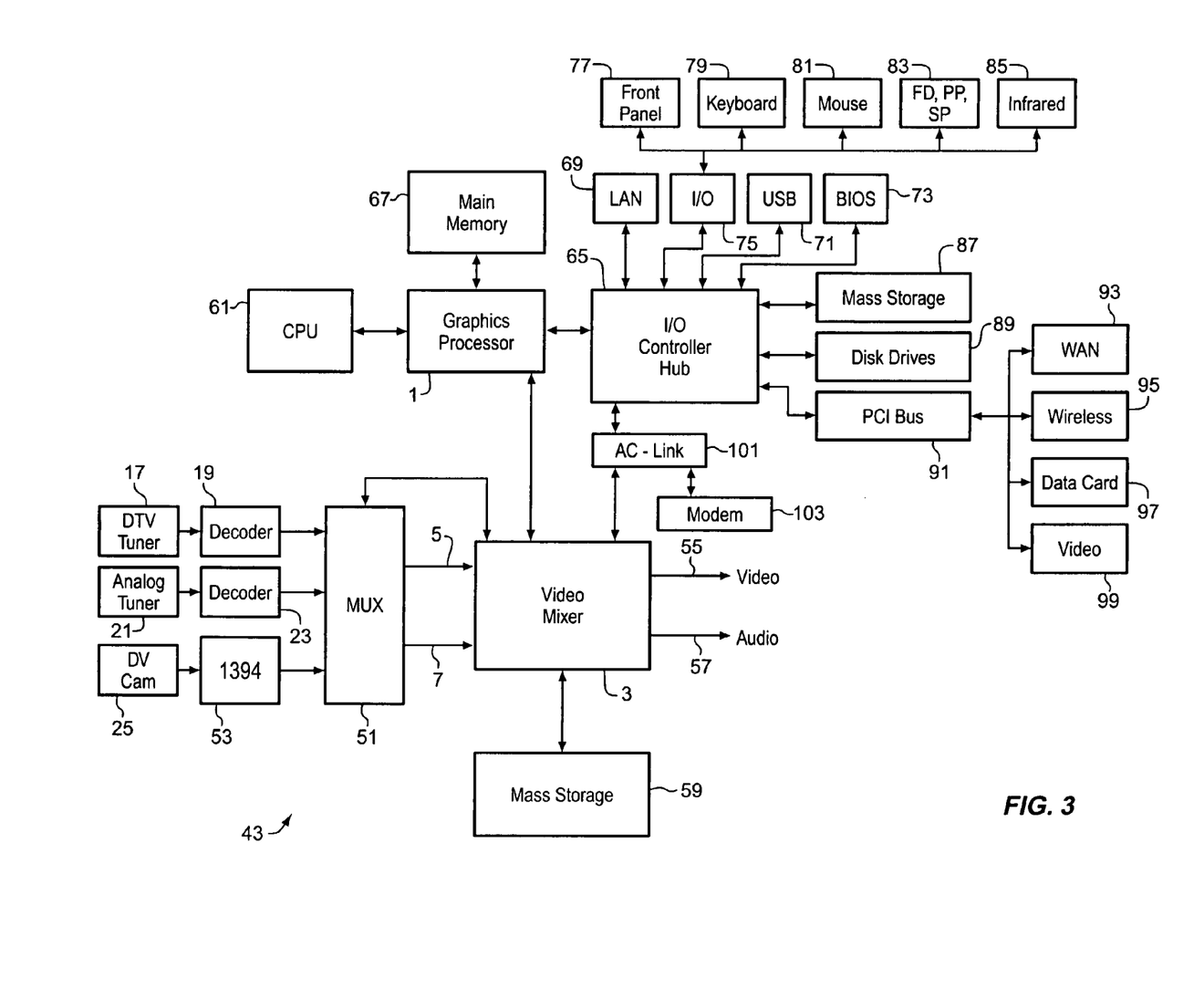
FIG. 3 is a block diagram of a media center suitable for implementing an embodiment of the present invention.

FIG. 3 shows a block diagram of a media center 43 suitable for using the video mixer 3 described above. In FIG. 3, a DTV (Digital Television) tuner module 17 is coupled to the video mixer through a digital decoder 19 and a multiplexer 51 using e.g. an I²C interface (Inter-Integrated Circuit, a type of bus designed by Phillips Semiconductors to connect integrated circuits). An analog tuner 21 is also coupled to the video mixer through a video decoder 23 and the multiplexer 51. Using the respective decoders, the video signals into and out of the multiplexer may be converted to a single common format for the video mixer. One such format is the ITU-R BT.656 format described above. However, other formats may by used instead. Alternatively, the formats may be converted by the video mixer.

The video mixer, in addition to the functions described above may also perform functions of a graphics controller. The video mixer may be a specialized component or part of a larger, more general or multiple purpose controller, which, in either case, may be implemented using any of a variety of different processors or ASICs. Some examples of graphics controllers include the ST Microelectronics® Sti70 15/20, the Zoran® TL8xx, or Generation 9, and the ATi® Technologies Xilleon™ lines of processors. The graphics controller may be the central processor for the larger system or coupled to a separate CPU, as shown in FIG. 3. Alternatively, the tuners may be coupled to the graphics processor 1 or to a CPU 61 over an I²C or suitable bus.

The tuners are coupled through a multiplexer 51. Other sources may also be coupled to the multiplexer, if desired, for example an IEEE 1394 appliance, such as a digital video camera 25 may be coupled though an IEEE 1394 interface 53 as shown. Some such other sources might include, tape players, disk players and MP3 players, among others. The multiplexer, under control of the video mixer, or alternatively, the graphics processor or a CPU selects which of the tuner or other inputs will be connected to the rest of the media center.

The selected video inputs are coupled to the multiplexer outputs which are, in the present example, routed to the video mixer 13. From the video mixer, the video and audio signals may be output for display, storage, or recording. In one embodiment, the video mixer contains MPEG-2 and MPEG-3 decoders as well as a video signal processor to format video and audio signals for use by the desired appliance.

The video mixer, as described above also receives command, control, menu, messaging and other images from the graphics processor 1 and combines them with the video and audio from the tuners.

For simplicity, FIG. 3 shows only one video output and one audio output, however, the number and variety of outputs may vary greatly depending on the particular application. If the media center is to function as a tuner, then a single DVI, or component video output, together with a single digital audio output, such as an optical S/PDIF (Sony/Philips Digital Interface) output, may suffice. In the configuration shown, the media center may be used as a tuner with picture-in-picture displays on a monitor or it may be used to record one channel while showing another. If the media center is to serve more functions then additional audio and video connections may be desired of one or more different types.

The actual connectors and formats for the video and audio connections may be of many different types and in different numbers. Some connector formats include coaxial cable, RCA composite video, S-Video, component video, DIN (Deutsche Industrie Norm) connectors, DVI (digital video interface), HDMI (High Definition Multimedia Interface), VGA (Video Graphics Adapter), USB (Universal Serial Bus) and IEEE (Institute of Electrical and Electronics Engineers) 1394. There are also several different proprietary connectors which may be preferred for particular applications. The types of connectors may be modified to suit a particular application or as different connectors become adopted.

The media center may also include a mass storage device 59, such as a hard disk drive, a volatile memory, a tape drive (e.g. for a VTR) or an optical drive. This may be used to store instructions for the graphics controller, to maintain an EPG (Electronic Program Guide) or to record audio or video received from the tuner module.

While the components described above are sufficient for many consumer electronics, home entertainment and home theater devices, such as tuners (terrestrial, cable, and satellite set-top boxes), VTR's, PVR's, digital media adapters, and televisions, among others. Further functionality may be provided using some of the additional components shown in FIG. 3. In addition, preamplifier and power amplifiers, control panels, or displays (not shown) may be coupled to the video mixer as desired.

The media center may also include a CPU (Central Processing Unit) 61 coupled to the graphics processor 1. This processor may also function as a supporting chipset for the CPU, as in the example of the 82835M GMCH chipset mentioned above. Any number of different CPU's and chipsets may be used. In one embodiment a Mobile Intel® Celeron® processor with an Intel® 82835 chipset is used, however the invention is not so limited. It offers more than sufficient processing power, connectivity and power saving modes. The host processor has a north bridge coupled to an I/O controller hub (ICH) 65, such as an Intel® FW82801DB (ICH4), and a south bridge coupled to on-board memory 67, such as RAM (Random Access Memory). The chipset also has an interface to couple with the graphics controller 41. Note that the invention is not limited to the particular choice of processors and supporting chips suggested herein.

The ICH 65 offers connectivity to a wide range of different devices. Well-established conventions and protocols may be used for these connections. The connections may include a LAN (Local Area Network) port 69, a USB hub 71, and a local BIOS (Basic Input/Output System) flash memory 73. A SIO (Super Input/Output) port 75 may provide connectivity for a front panel 77 with buttons and a display, a keyboard 79, a mouse 81, and infrared devices 85, such as IR blasters or remote control sensors. The I/O port may also support floppy disk, parallel port, and serial port connections. Alternatively, any one or more of these devices may be supported from a USB, PCI or any other type of bus.

The ICH may also provide an IDE (Integrated Device Electronics) bus for connections to disk drives 87, 89 or other large memory devices. The mass storage may include hard disk drives and optical drives. So, for example, software programs, user data, EPG data and recorded entertainment programming may be stored on a hard disk drive or other drive. In addition CD's (Compact Disk), DVD's (Digital Versatile Disk) and other storage media may be played on drives coupled to the IDE bus.

A PCI (Peripheral Component Interconnect) bus 91 is coupled to the ICH and allows a wide range of devices and ports to be coupled to the ICH. The examples in FIG. 3 include a WAN (Wide Area Network) port 93, a Wireless port 95, a data card connector 97, and a video adapter card 99. There are many more devices available for connection to a PCI port and many more possible functions. The PCI devices may allow for connections to local equipment, such as cameras, memory cards, telephones, PDA's (Personal Digital Assistant), or nearby computers. They may also allow for connection to various peripherals, such as printers, scanners, recorders, displays and more. They may also allow for wired or wireless connections to more remote equipment or any of a number of different interfaces. The remote equipment may allow for communication of programming or EPG data, for maintenance or remote control or for gaming, Internet surfing or other capabilities.

Finally, the ICH is shown with an AC-Link (Audio Codec Link) 101, a digital link that supports codecs with independent functions for audio and modem. In the audio section, microphone input and left and right audio channels are supported. In the example of FIG. 3, the AC-Link supports a modem 103 for connection to the PSTN, as well as an audio link to the graphics controller 41. The AC-Link carries any audio generated by the CPU, Host Controller or ICH to the video mixer for integration with the audio output 57. Alternatively, an ISA (Industry Standard Architecture) bus, PCI bus or any other type connection may be used for this purpose. As can be seen from FIG. 3, there are many different ways to support the signals produced by the tuner and to control the operation of the tuners. The architecture of FIG. 3 allows for a wide range of different functions and capabilities. The particular design will depend on the particular application.

Figure 4:
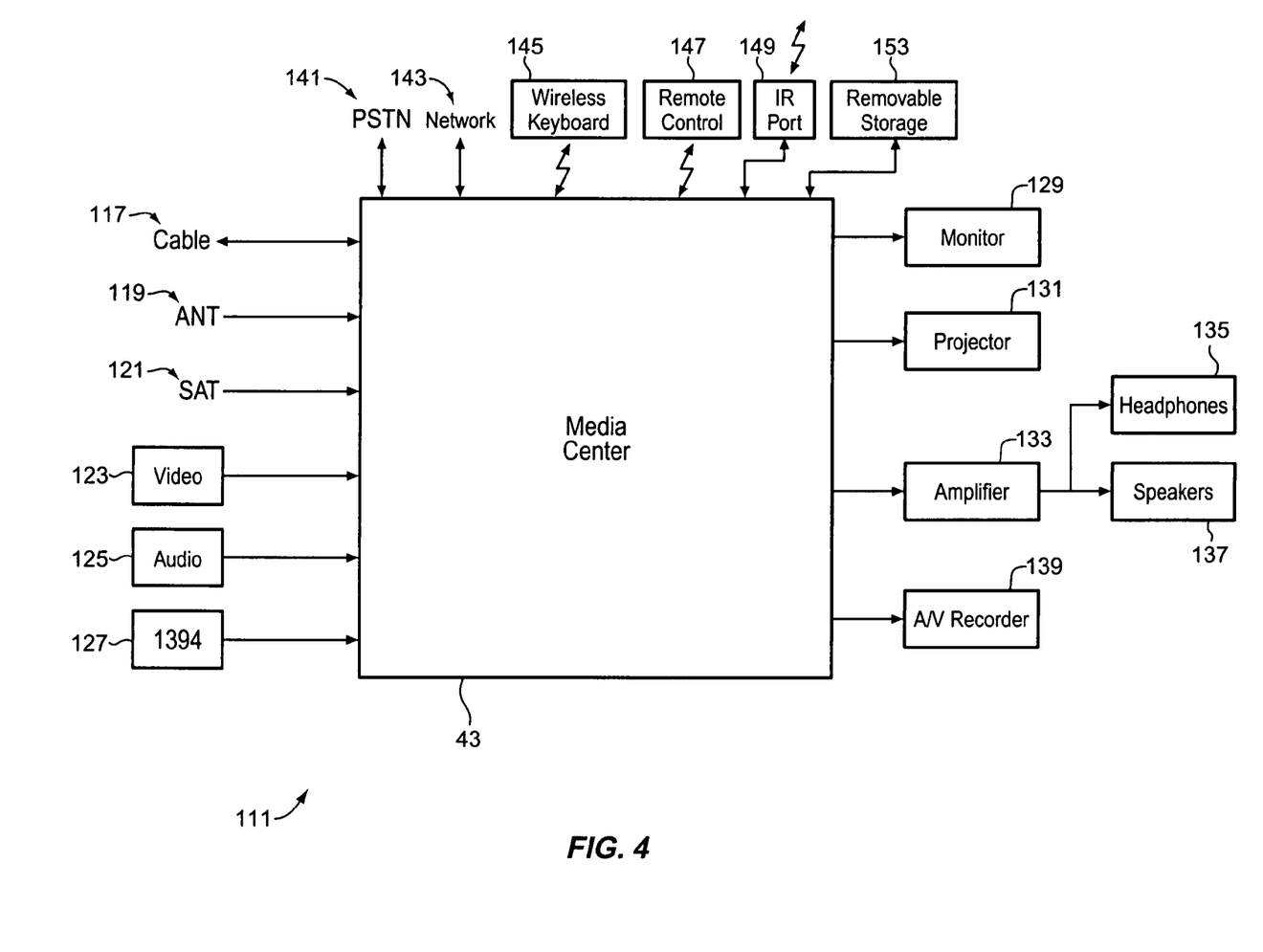
FIG. 4 is a block diagram of an entertainment system suitable for use with the present invention.

FIG. 4 shows a block diagram of an entertainment system 111 suitable for use with the media center of FIG. 3. FIG. 4 shows an entertainment system with a wide range of installed equipment. This equipment is shown as examples of many of the possibilities. The present invention may be used in a much simpler or still more complex system. The media center as described in FIG. 3, is able to support communication through WAN and LAN connections, Bluetooth, IEEE 802.11 USB, 1394, IDE, PCI, and Infrared. In addition, the tuner module receives inputs from antennas, component, and composite video and audio and IEEE 1394 devices. This provides extreme flexibility and variety in the types of devices that may be connected and operate with the media center. Other interfaces may be added or substituted for those described as new interfaces are developed and according to the particular application for the media center. Many of the connections may be removed to reduce cost. The specific devices, shown in FIG. 4 represent one example of a configuration that may be suitable for a consumer home entertainment system.

The media center 43 has several different possible inputs as described above. In the example of FIG. 4, these include a television cable 117, a broadcast antenna 119, a satellite receiver 121, a video player 123, such as a tape or disk player, an audio player 125, such as a tape, disk or memory player, and a digital device 127, connected for example by an IEEE 1394 connection.

These inputs, after processing, selection and control may be used to generate outputs for a user. The outputs may be rendered on a monitor 129, or projector 131, or any other kind of perceivable video display. The audio portion may be routed through an amplifier 133, such as an A/V receiver or a sound processing engine, to headphones 135, speakers 137 or any other type of sound generation device. The outputs may also be sent to an external recorder 139, such as a VTR, PVR, CD or DVD recorder, memory card etc.

The media center also provides connectivity to external devices through, for example a telephone port 141 and a network port 143. The user interface is provided through, for example, a keyboard 145, or a remote control 147 and the media center may communicate with other devices through its own infrared port 149. A removable storage device 153 may allow for MP3 compressed audio to be stored and played later on a portable device or for camera images to be displayed on the monitor 129.

There are many different equipment configurations for the entertainment center using the media center of FIG. 3 and many different possible choices of equipment to connect. A typical home entertainment system, using typical currently available equipment, might be as follows. As inputs, this typical home entertainment system might have a television antenna 119 and either a cable television 117 or DBS 121 input to the tuner module of the media center. A VTR or DVD recorder might be connected as an input device 123 and an output device 139. A CD player 125 and an MP3 player 127 might be added for music. Such a system might also include a wide screen high definition television 129, and a surround sound receiver 133 coupled to six or eight speakers 137. This same user system would have a small remote control 147 for the user and offer remote control 149 from the media center to the television, receiver, VTR, and CD player. An Internet connection 141 and keyboard 145 would allow for web surfing, upgrades and information downloads, while a computer network would allow for file swapping and remote control from or to a personal computer in the house.

It is to be appreciated that a lesser or more equipped video mixer, entertainment system and media center than the examples described above may be preferred for certain implementations. Therefore, the configuration of the entertainment system, media center, and components will vary from implementation to implementation depending upon numerous factors, such as price constraints, performance requirements, technological improvements, or other circumstances. Embodiments of the invention may also be applied to other types of software-driven systems that use different hardware architectures than that shown in FIGS. 1,2, 3 and 4.

In the description above, for purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various steps. The steps of the present invention may be performed by hardware components, such as those shown in FIGS. 1, 3, and 4, or may be embodied in machine-executable instructions, which may be used to cause general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a media center (or other electronic devices) to perform a process according to the present invention. The machine-readable medium may include, but is not limited to, floppy diskettes, optical disks, CD-RQMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded for storage in a machine-readable medium as a computer program product, wherein the program may be transferred to the machine-readable medium from a remote computer to a requesting computer by way of data signals embodied in a carrier wave or other propagation medium via a communication link (e.g., a modem or network connection).

Many of the methods and apparatus are described in their most basic form but steps may be added to or deleted from any of the methods and components may be added or subtracted from any of the described apparatus without departing from the basic scope of the present invention. It will be apparent to those skilled in the art that many further modifications and adaptations may be made. The particular embodiments are not provided to limit the invention but to illustrate it. The scope of the present invention is not to be determined by the specific examples provided above but only by the claims below.

What is claimed is:

1. A method comprising:
receiving a multiple pixel graphics signal from a graphics engine, the graphics signal including a multiple pixel image portion and an alpha component having a set of bits for each pixel;
receiving a primary video signal, separate from the graphics signal, from a first video source;
receiving a secondary video signal, separate from the graphics signal, from a second video source;
extracting a first portion of the received alpha component;
applying the first portion of the received alpha component to the graphics signal with which the alpha component was included;
extracting a second portion of the received alpha component having at least one bit to define an overlay for the secondary video signal over the primary video signal;
applying the second extracted portion of the alpha signal of the graphics signal to render the secondary video signal over the primary video signal.

2. The method of claim 1, wherein the multiple pixel image signal comprises a set of bits for each pixel.

3. The method of claim 1, wherein extracting the second extracted portion of the alpha component comprises reading one bit of a multiple bit alpha component to build a pixel mask, and wherein applying the second extracted portion comprises using the pixel mask to define the shape and position of the secondary video over the primary video.

4. The method of claim 1, wherein applying the second extracted portion comprises generating a pixel mask to define the shape and position of the secondary video over the primary video.

5. A machine-readable medium having stored thereon data representing instructions which, when executed by a machine, cause the machine to perform operations comprising:
receiving a multiple pixel graphics signal from a graphics engine, the graphics signal including a multiple pixel image portion and an alpha component having a set of bits for each pixel;
receiving a primary video signal, separate from the graphics signal, from a first video source;
receiving a secondary video signal, separate from the graphics signal, from a second video source;
extracting a first portion of the received alpha component;
applying the first portion of the received alpha component to the graphics signal with which the alpha component was included;
extracting a second portion of the received alpha component having at least one bit to define an overlay for the secondary video signal over the primary video signal;
applying the second extracted portion of the alpha signal of the graphics signal to render the secondary video signal over the primary video signal.

6. The medium of claim 5, wherein the multiple pixel image signal comprises a set of bits for each pixel.

7. The medium of claim 5, wherein extracting the second extracted portion of the alpha component comprises reading one bit of a multiple bit alpha component to build a pixel mask, and wherein applying the second extracted portion comprises using the pixel map to define the shape and position of the secondary video over the primary video.

8. An apparatus comprising:
a graphics port to receive a multiple pixel graphics signal from a graphics engine, the graphics signal including an alpha component having a set of bits for each pixel;
a first video port to receive a first video signal, separate from the graphics signal, from a first video source;
a second video port to receive a second video signal, separate from the graphics signal, from a second video source;
a memory; and
a video mixer to extract a first portion of the received alpha component of the graphics signal to apply to the graphics signal, to extract a second portion of the received alpha component of the graphics signal from the graphics signal having at least one bit to define an overlay for the second video signal over the first video signal, to store the second extracted portion in the memory and to apply the second extracted portion to render the secondary video signal over the primary video signal.

9. The apparatus of claim 8, wherein the graphics port comprises a bus to a graphics processor.

10. The apparatus of claim 8, wherein the graphics port comprises an interconnect bus.

11. The apparatus of claim 8, wherein the graphics port comprises a RGBA port.

12. The apparatus of claim 8, wherein the first portion of the alpha component defines a blending of the graphics.

13. The apparatus of claim 8, wherein the graphics processor stores a mask in the memory to apply to the first video signal to define an overlay of the first video signal over the second video signal.

14. A digital set-top box comprising:
a graphics processor to generate a multiple pixel graphics signal, the graphics signal including an alpha component having a set of bits for each pixel;
a first video port to receive a first video signal, separate from the graphics signal;
a second video port to receive a second video signal, separate from the graphics signal;
a memory; and
a video mixer to extract a first portion of the received alpha component of the graphics signal to apply to the graphics signal, to extract a second portion of the received alpha component of the graphics signal from the graphics signal having at least one bit to define an overlay for the second video signal over the first video signal, to store the second extracted portion in the memory and to apply the second extracted portion to render the secondary video signal over the primary video signal.

15. The set-top box of claim 14, wherein the graphics port comprises a bus to a graphics processor.

16. The set-top box of claim 14, wherein the graphics port comprises an interconnect bus.

17. The set-top box of claim 14, wherein the graphics port comprises a RGBA port.

18. The set-top box of claim 14, wherein the first portion of the alpha component defines a blending of the graphics signal.

19. The set-top box of claim 14, wherein the graphics processor stores a mask in the memory to apply to the first video signal to define an overlay of the first video signal over the second video signal.

20. A video mixer comprising:
means for extracting a plurality of multiple pixel graphics components from a video signal, each graphics component defining a pixel of a first image;

means for blending the image using a plurality of blending components from the video signal, each blending component associated with a graphics component and defining a blending of the first image with a second external image, the blending components having a set of bits for each pixel;

means for overlaying the external image using a plurality of overlay components from the video signal, each overlay component associated with a blending component and having at least one bit to define an overlay for the second external image separate from the graphics portion over a third external image also separate from the graphics portion.

21. The video mixer of claim 20, wherein the graphics components comprise red, blue, and green components.

22. The video mixer of claim 20, wherein each overlay component defines an overlay for its associated pixel.

23. The video mixer of claim 20, wherein the second external image and the third external image are combined to create a combined image and the image defined by the graphics components is blended with the combined image to create a composite image and wherein each overlay component defines an overlay for its associated pixel of the composite image.

24. The video mixer of claim 20, wherein the graphics components and the blending components are in accordance with an RGBA output stream except that a portion of the A component of the output stream is used as the overlay components.

* * * * *